US012608062B2

(12) United States Patent (10) Patent No.: US 12,608,062 B2
Files et al. (45) Date of Patent: Apr. 21, 2026

(54) POWER MANAGEMENT FOR A DATA PROCESSING SYSTEM

(71) Applicant: Dell Products L.P., Round Rock, TX (US)

(72) Inventors: Jace W. Files, Round Rock, TX (US); Merle Jackson Wood, III, Round Rock, TX (US); Gerald Rene Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 69 days.

(21) Appl. No.: 18/758,022

(22) Filed: Jun. 28, 2024

(65) Prior Publication Data

US 2026/0003407 A1 Jan. 1, 2026

(51) Int. Cl.
*G06F 1/26* (2006.01)
*G06F 13/40* (2006.01)

(52) U.S. Cl.
CPC ................ *G06F 1/26* (2013.01); *G06F 1/266* (2013.01); *G06F 13/4063* (2013.01)

(58) Field of Classification Search
CPC ......... G06F 1/26; G06F 1/266; G06F 13/4063

USPC ............................................ 713/300; 710/16
See application file for complete search history.

(56) References Cited

U.S. PATENT DOCUMENTS

| | | | |
|---|---|---|---|
| 10,317,436 B2 * | 6/2019 | Thompson ....... | H03K 19/01759 |
| 2013/0241285 A1 * | 9/2013 | Shieh ...................... | H02M 3/04 |
| | | | 307/31 |
| 2018/0314317 A1 * | 11/2018 | Tsutsui ................... | G06F 1/263 |
| 2020/0174539 A1 * | 6/2020 | Lin ......................... | G06F 1/263 |
| 2021/0103330 A1 * | 4/2021 | Tan ........................ | G06F 1/3243 |
| 2021/0149468 A1 * | 5/2021 | Walsh ..................... | H02J 1/084 |
| 2024/0012782 A1 * | 1/2024 | Hung .................. | G06F 13/4022 |

* cited by examiner

*Primary Examiner* — Ji H Bae
(74) *Attorney, Agent, or Firm* — WOMBLE BOND DICKINSON (US) LLP

(57) ABSTRACT

Methods and systems for management of power distribution for a data processing system are disclosed. The method may include classifying an external device that may be attached to a port of the data processing system with respect to power consumption and power provisioning. The method may also include reconfiguring a switch network that connects the port to which the external device may be attached to load components (e.g., a battery, hardware resources, etc.) of the data processing system so that a power delivery path may be established. Power delivery may be performed to distribute power to the data processing system and/or to the external device using the power delivery path.

20 Claims, 8 Drawing Sheets

POWER MANAGEMENT FOR A DATA PROCESSING SYSTEM

FIELD

Embodiments disclosed herein relate generally to managing power distribution for a data processing system. More particularly, embodiments disclosed herein relate to managing power distribution by reconfiguring a switch network to enable power delivery paths in the data processing system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
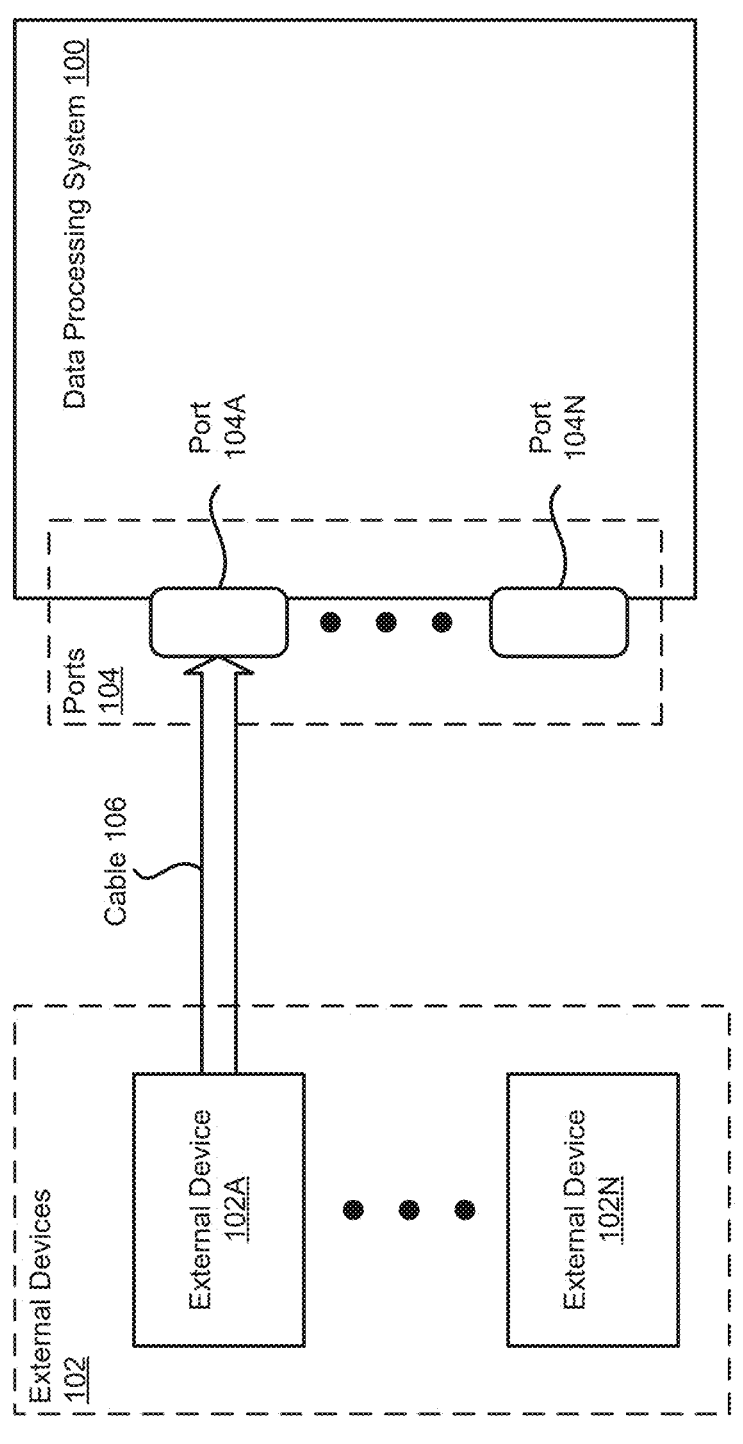
FIG. 1A shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing power distribution for a data processing system. The data processing system may provide computer-implemented services by providing desired power to components of the data processing system and/or to an external device attached to the data processing system.

The data processing system may host any number of ports (e.g., Universal Service Bus (USB) Type-C ports) that external devices may attach to. When attached to a port of the ports of the data processing system, an external device (e.g., a charger) may provide power via a power delivery path to components (e.g., batteries, a processor, etc.) of the data processing system. The external device may deliver power at a certain power provisioning rate (e.g., a certain wattage). Because the data processing system may include power delivery devices that may each be limited to a second power provisioning rate, the data processing system may not obtain the desired power.

To improve a likelihood that the data processing system may obtain the desired power, a switch network of the data processing system may be reconfigured to establish a power delivery path for delivery of power by the external device to components of the data processing system. To do so, a new configuration for the switch network may be selected based on the power provisioning rate of the external device and efficiency curves for the power delivery devices of the data processing system. For example, connectivity of the switch network may be updated to enable power to flow from the port to which the external device is connected to two power delivery devices and subsequently to a battery of the data processing system. By doing so, the battery may be charged at a desired charging rate.

Furthermore, an external device that consumes power may be connected to a port of the data processing system (e.g., to a second port while the external device that delivers power is connected to a first port, to a port while other external devices are not connected, etc.). When the external device that consumes power is connected to the port, the switch network may be reconfigured to enable power to flow from a voltage source (e.g., the battery) of the data processing system to the external device.

Thus, embodiments disclosed herein may provide an improved method for managing power distribution for a data processing system by reconfiguring a switch network to establish one or more power delivery paths between one or more ports of the data processing system and components of the data processing system. By doing so, desired power may be provided to the data processing system and/or by the data processing system for use in providing computer-implemented services.

In an embodiment, a method for managing power distribution for a data processing system is provided. The method may include: (i) identifying an occurrence of a change in attachment of an external device to a port of the data processing system; (ii) based on the occurrence: (a) classifying the external device with respect to power consumption and power provisioning; (b) in a first instance of the classifying where the external device is classified as a power provisioning device: identifying a power provisioning rate of the external device; reconfiguring, based on the power provisioning rate, a switch network that connects a port of the data processing system to which the external device is connected to establish a power delivery path for delivery of power by the external device to the data processing system; and performing power delivery to the data processing system using the power delivery path.

Identifying the power provisioning rate of the external device may include: (i) communicating, by the data processing system and to the external device, a request for information regarding the power provisioning rate of the external device; and (ii) obtaining, by the data processing system, the information.

Reconfiguring the switch network may include: (i) selecting, based on the power provisioning rate and efficiency curves for power delivery devices of the data processing system, a new configuration for the switch network; and (ii) updating connectivity of the switch network based on the new configuration.

The switch network may include: (i) a first load switch that connects the port to a first power delivery device of the power delivery devices; (ii) a second load switch that connects a second port of the data processing system to a second power delivery device of the power delivery devices; (iii) a third load switch that connects the port to the second power delivery device; (iv) a fourth load switch that connects a voltage source to the second port, the voltage source supplying power from a battery of the data processing system; and (v) a fifth load switch that connects the voltage source to the port.

The load switch may be a computer controllable device that may allow power to flow between two entities that the load switch connects when the load switch is closed and does not allow power to flow between the two entities when the load switch is open.

Updating the connectivity may include: (i) closing the first load switch and the third load switch so that the port is connected to both the first power delivery device and the second power delivery device; and (ii) opening the second load switch, the fourth load switch, and the fifth load switch so that the second port is not connected to any power delivery device and the voltage source is not connected to any port.

Updating the connectivity may also include: (i) closing the first load switch so that the port is connected to the first power delivery device; and (ii) opening the second load switch, the third load switch, the fourth load switch, and the fifth load switch so that the second port is not connected to any power delivery device and the voltage source is not connected to any port.

The method may further include: in a second instance of the classifying where the external device is classified as a power consuming device: (i) performing a second reconfiguration of the switch network that connects the port of the data processing system to which the external device is connected to establish a second power delivery path for delivery of power to the external device by the data processing system; and (ii) performing power delivery to the external device using the second power delivery path.

Performing the second reconfiguration of the switch network may include: (i) closing the first load switch so that the port is connected to the first power delivery device; and (ii) opening the second load switch, the third load switch, the fourth load switch, and the fifth load switch so that the second port is not connected to any power delivery device and the voltage source is not connected to any port.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a system in accordance with an embodiment is shown. The system may provide any number and types of computer-implemented services (e.g., to user of the system and/or devices operably connected to the system). The computer-implemented services may include, for example, data storage service, instant messaging services, etc.

To provide the computer-implemented services, the system may include data processing systems 100. When providing the computer-implemented services, data processing system 100 may consume and/or provide electrical power from/to external devices 102. External devices 102 may include, for example, devices that provision power (e.g., chargers, power banks, etc.) and/or devices that consume power (e.g., phones, auxiliary devices, etc.).

To establish connections with external devices 102, data processing system 100 may include ports 104. Ports 104 may include, for example, a USB Type-C port with which a USB Type-C connector may be attached (and/or other types of ports such as USB Type-A, etc.). An external device (e.g., 102A) of external devices 102 may be operably connected to data processing system 100 via cable 106. For example, external device 102A may establish a connection with data processing system 100 by attaching a connector of cable 106 to port 104A. When attached via cable 106, external device 102A may provision power to data processing system 100.

Each external device of external devices 102 that provisions power may be capable of providing power to data processing system 100 at a certain power provisioning rate (e.g., 65 watts, 90 watts, 130 watts, etc.). The power may be provided to components of data processing system 100 that require the power (e.g., batteries, hardware resources, etc.) via a power delivery path (e.g., a charging circuit) that delivers the power from the external device to the components of data processing system 100. The components may desire to obtain the power at the certain power provisioning rate (e.g., for fast charging).

However, desired power may not be delivered to the components of data processing system 100 if a power provisioning rate of an external device exceeds a capacity of a power delivery path. For example, if an external device with a power provisioning rate of 130 watts is attached to a port of the data processing system and a power delivery path from the port includes a power delivery device (e.g., power converter) with a capacity of 65 watts, then desired power of 130 watts may not be delivered to the data processing system.

In general, embodiments disclosed herein may provide methods, systems, and/or devices for managing power distribution for a data processing system. To manage power distribution for the data processing system, a power delivery path that delivers desired power may be established based on a power provisioning rate of an external device that is connected to a port of the data processing system.

When an external device is attached to a port of the data processing system, the data processing system may classify the external device as a power provisioning device or a power consuming device. If the external device is classified as a power provisioning device, the data processing system may (i) identify a power provisioning rate of the external device, (ii) reconfigure a switch network based on the power provisioning rate, (iii) perform power delivery, and/or perform any other actions.

The power provisioning rate of the external device may be identified by communicating, by the data processing system and to the external device, a request for information regarding the power provisioning rate of the external device. The information may be obtained by the data processing system from the external device while the external device is operating in a low voltage state.

Based on at least the power provisioning rate, a switch network hosted by the data processing system may be reconfigured to establish a delivery path for delivery of desired power. A power delivery path may allow delivery of power to the data processing system by providing a path for the power to flow from a port of the data processing system to one or more components of the data processing system. The power delivery path may include, for example, power delivery devices, load switches, and/or any other circuitry components.

The switch network may include a plurality of load switches. A load switch of the load switches may include a computer controllable device that allows power to flow between two entities that the load switch connects when the load switch is closed and does not allow power to flow between the two entities when the load switch is open.

To reconfigure the switch network, the data processing system may select a new configuration for the switch network based on, for example, the power provisioning rate of the external device, efficiency curves for power delivery devices of the data processing system, and/or any other information. The new configuration may include instructions for modifying an operating state (e.g., open or closed) of each load switch in the switch network. Once selected, connectivity of the switch network may be updated based on the new configuration.

For example, consider a scenario in which an external device with a power provisioning rate of 130 watts is attached to a port of the data processing system and each power delivery device of power delivery devices hosted by the data processing system has a power capacity of 65 watts. The switch network may be reconfigured to establish a power delivery path that enables power to flow from the port to both a first power delivery device and a second power delivery device (e.g., parallel charging), and subsequently to a battery and/or other hardware resources of the data processing system.

In another example, consider a scenario in which an external device with a power provisioning rate of 65 watts is attached to a port of the data processing system and each power delivery device of power delivery devices hosted by the data processing system has a power capacity of 65 watts. Efficiency curves for the power delivery devices may indicate that a power delivery device may operate most efficiently (e.g., deliver power at a desired rate, reduce a thermal impact, etc.) when power is delivered through the power delivery device at a certain percentage (e.g., 60 percent) of the power capacity of the power delivery device. In this scenario, the switch network may similarly be reconfigured to establish a power delivery path that enables power to flow from the port to both the first power delivery device and the second power delivery device, and subsequently to the battery and/or other hardware resources of the data processing system.

Furthermore, a second external device (e.g., an external device that consumes power) may attached to a second port of the data processing system. When the second external device is classified as an external device that consumes power, the switch network may be reconfigured to allow power to flow from the battery (e.g., via a voltage regulator)

to the second port. By doing so, power may be provided to an external device attached at a port of the data processing system while any number of additional external devices are attached to additional ports of the data processing system.

To provide the above noted functionality, the system may include data processing system 100, external devices 102, ports 104, and cable 106. Each of these components is discussed below.

Data processing system 100, as discussed above, may provide power delivery management services. To do so, data processing system 100 may host a switch network that may be reconfigured by data processing system 100 to establish a plurality of power delivery paths for delivery of power by an external device of external devices 102 to data processing system 100 and/or delivery of power by data processing system 100 to the external device.

Figure 1B:
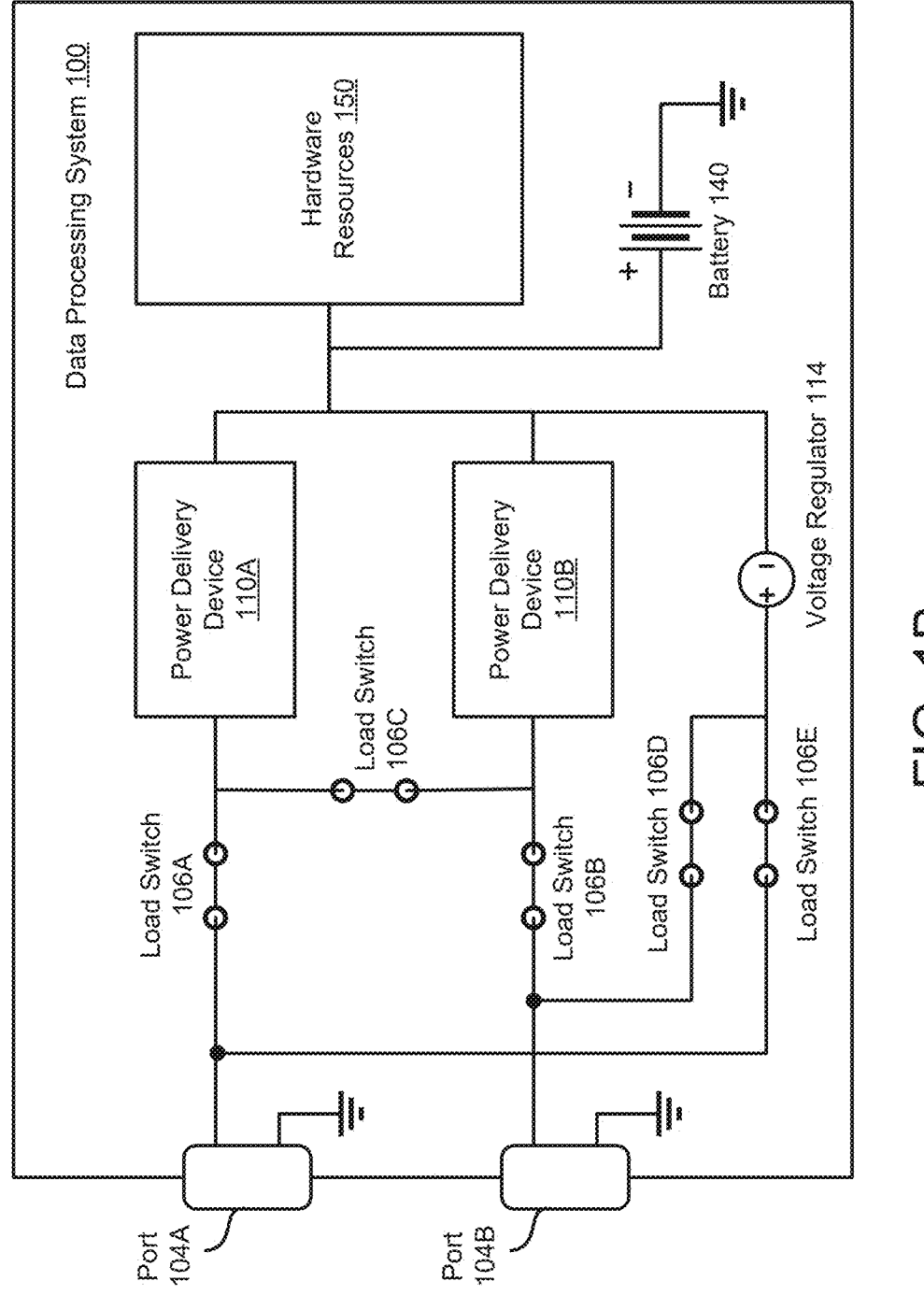
FIG. 1B shows a diagram illustrating a data processing system in accordance with an embodiment.

Additionally, data processing system 100 may monitor ports 104 to identify an occurrence of a change in attachment of external devices 102 to ports 104. When a change in attachment is identified, data processing system 100 may classify an external device (e.g., 102A) of external devices 102 with respect to power consumption and power provisioning, identify a power provisioning rate if external device 102A is a power provisioning device, reconfigure the switch network to establish a power delivery path for delivery of desired power, and perform power delivery. Refer to FIG. 1B for additional details regarding data processing system 100.

External devices 102 may provide power provisioning services and/or power consuming services. To do so, an external device (e.g., 102A) of external devices 102 may attach to data processing system 100, provide information regarding a classification of the external device (e.g., as a power provisioning device or power consuming device), provide information regarding a power provisioning rate if the external device is a power provisioning device, provision power to data processing system 100, consume power from data processing system 100, and/or perform any other actions.

Ports 104 may provide device connection services. To do so, a port (e.g., 104A) of ports 104 may accept attachments from an external device of external devices 102 via cable 106. For example, ports 104 may include a female connector (e.g., a USB Type-C connector) that a corresponding male connector of cable 106 (e.g., a USB Type-C connector) may be inserted to establish a connection.

Cable 106 may facilitate transfer of power between data processing system 100 and an external device of external devices 102. To do so, cables 106 may physically attach to a port of ports 104 to allow for an operable electrical connection to be formed with data processing system 100. For example, cable 106 may, as discussed above, include a connector (e.g., a USB Type-C connector) that connects to a port of ports 104.

Figure 2:
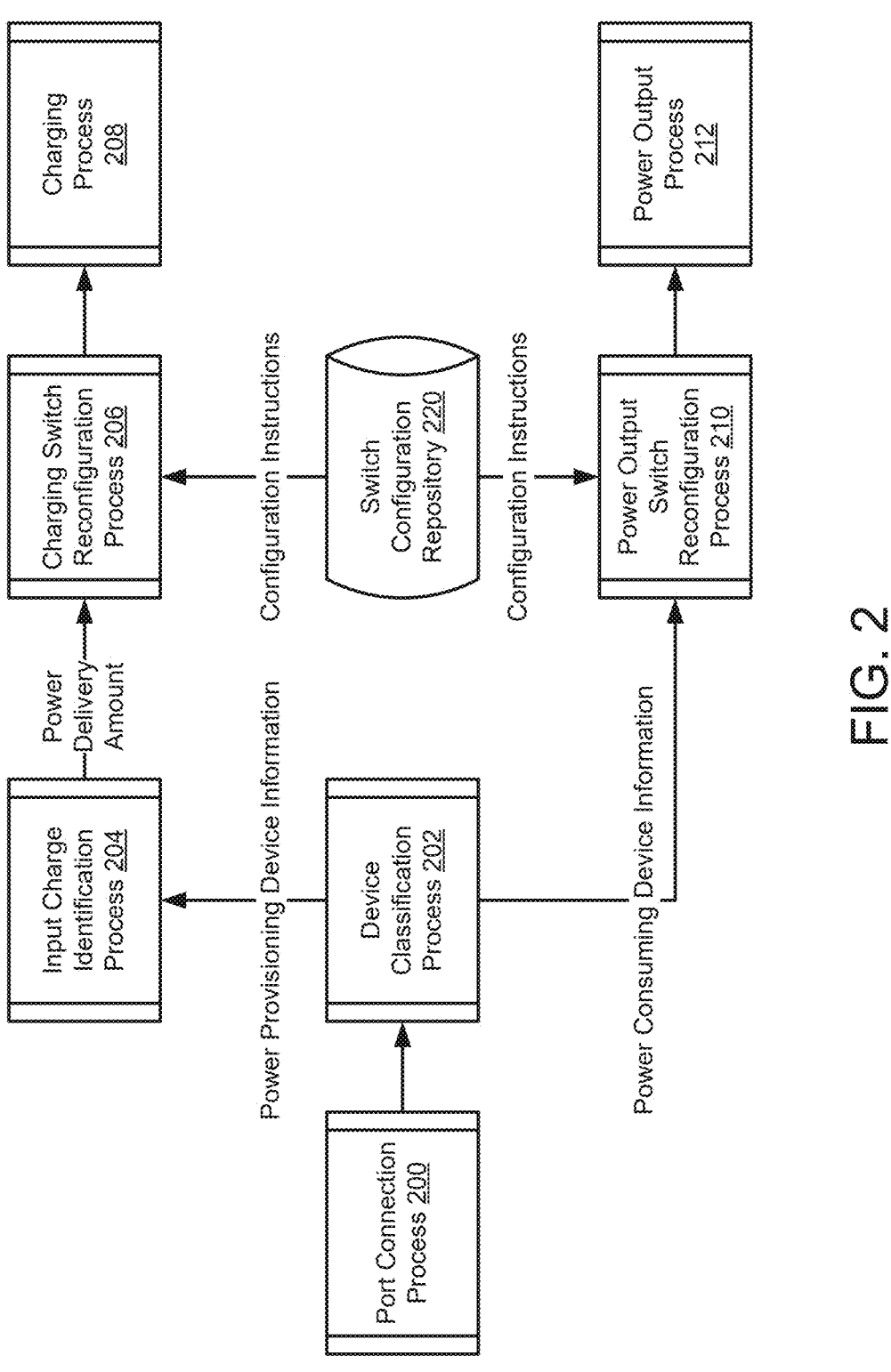
FIG. 2 shows a data flow diagram in accordance with an embodiment.
Figure 3:
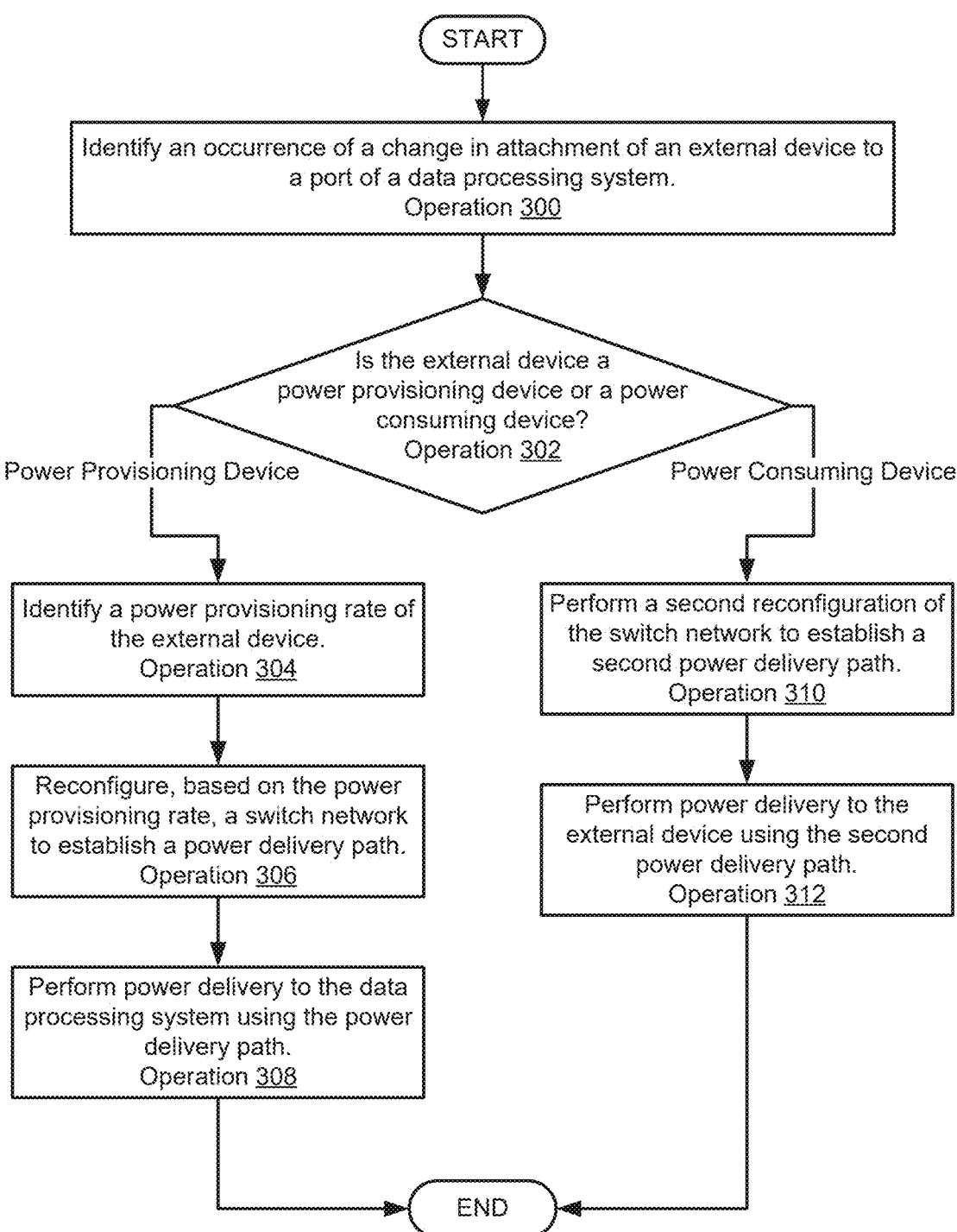
FIG. 3 shows a flow diagram illustrating methods in accordance with an embodiment.

While providing their functionality, any of data processing system 100, external devices 102, ports 104, and cable 106 may provide all or a portion of the methods shown in FIGS. 2-3.

While illustrated in FIG. 1A with a limited number of specific components, a system may include additional, fewer, and/or different components without departing from embodiments disclosed herein.

Turning to FIG. 1B, a schematic diagram of data processing system 100 in accordance with an embodiment is shown.

As discussed above, data processing system may manage a switch network that includes a plurality of load switches (e.g., 106A, 106B, 106C, 106D, 106E, etc.). Each load switch may include a computer controllable device (e.g., an integrated circuit) that controls flow of power to an entity in an electronic circuit of data processing system 100A. The load switch may be closed to allow power (e.g., via an electrical current) to flow through the load switch or open to interrupt a flow of power. By updating connectivity of load switches in the switch network hosted by data processing system 100, new power delivery paths may be established.

Load switch 106A may be a first load switch that connects port 104A to at least power delivery device 110A. If load switch 106A is closed, power may be allowed to flow from port 104A to power delivery device 110A. If load switch 106A is open, power may not flow from port 104A. Load switch 106A may be opened, for example, if no external device is identified to be attached to port 104A and/or if an external device attached to port 104A is a power consuming device.

Similarly, load switch 106B may be a second load switch that connects port 104B to at least power delivery device 110B. If load switch 106B is closed, power may be allowed to flow from port 104B to power delivery device 110B. If load switch 106B is open, power may not flow from port 104B.

Load switch 106C may be a third load switch located after load switch 106A and load switch 106B and may enable power to flow from one port (e.g., port 104A or port 104B) to both power delivery devices. For example, consider a scenario in which load switch 106A and load switch 106C are closed and load switch 106B is open. Power may be delivered (e.g., at a proportional rate) from port 104A to both power delivery device 110A and power delivery device 110B. By using load switch 106C, power may be delivered (e.g., at a power provisioning rate of an external device attached at a port of data processing system 100) to battery 140 and/or hardware resources 150 via a power delivery path that includes a plurality of power delivery devices.

Load switch 106D may be a fourth load switch that connects voltage regulator 114 to port 104B. If load switch 106D is closed, power may be allowed to flow from voltage regulator 114 to port 104B, thereby providing power to an external device that may be attached to port 104B. If load switch 106B is open, power may not flow to port 104B.

Load switch 106E may be a fifth load switch that connects voltage regulator 114 to port 104A. If load switch 106E is closed, power may be allowed to flow from voltage regulator 114 to port 104A, thereby providing power to an external device that may be attached to port 104A. If load switch 106E is open, power may not flow to port 104A.

Power delivery device 110A may include a computer controllable device (e.g., an integrated circuit) that may facilitate delivery of power to load components of data processing system 100. To do so, power delivery device 110A may manage charging protocols (e.g., USB-C), enforce power delivery limits, configure power delivery output (e.g., at a certain voltage and/or current), and/or perform any other actions. While operating, power delivery device 110A may perform functionality at a certain efficiency (e.g., a factor of power waste as heat) based on a power provisioning rate that power delivery device 110A may be managing. Efficiency of power delivery device 110A may be represented (e.g., inferred) from an efficiency curve of power delivery device 110A. Power delivery device may provide the power to battery 140 and/or hardware resources 150.

Voltage regulator 114 may include a computer controllable device (e.g., an integrated circuit) that may facilitate delivery of power from battery 140 to ports 104. To do so, voltage regulator may control power delivered by battery 140 such that the power is delivered at a certain constant voltage (e.g., 5 volts). By doing so, power delivered to an external device attached at a port may be within a voltage range that may be compatible with the external device.

While illustrated with respect to exemplary set of load switches and power delivery devices, additional power delivery devices and load switches may be added to scale the power capacity of power paths. The additional load switches may facilitate connection/disconnection of the additional power delivery device. Any number of such additional power delivery stages may be present without departing from embodiments disclosed herein.

Battery 140 may store power obtained from an external device. To do so, battery 140 may obtain at least a portion of power provisioned by the external device via a power delivery path. Battery 140 may subsequently provide the stored power to hardware resources 150, a second external device that consumes power and is attached to data processing system 100, and/or any other entities.

Figure 4:
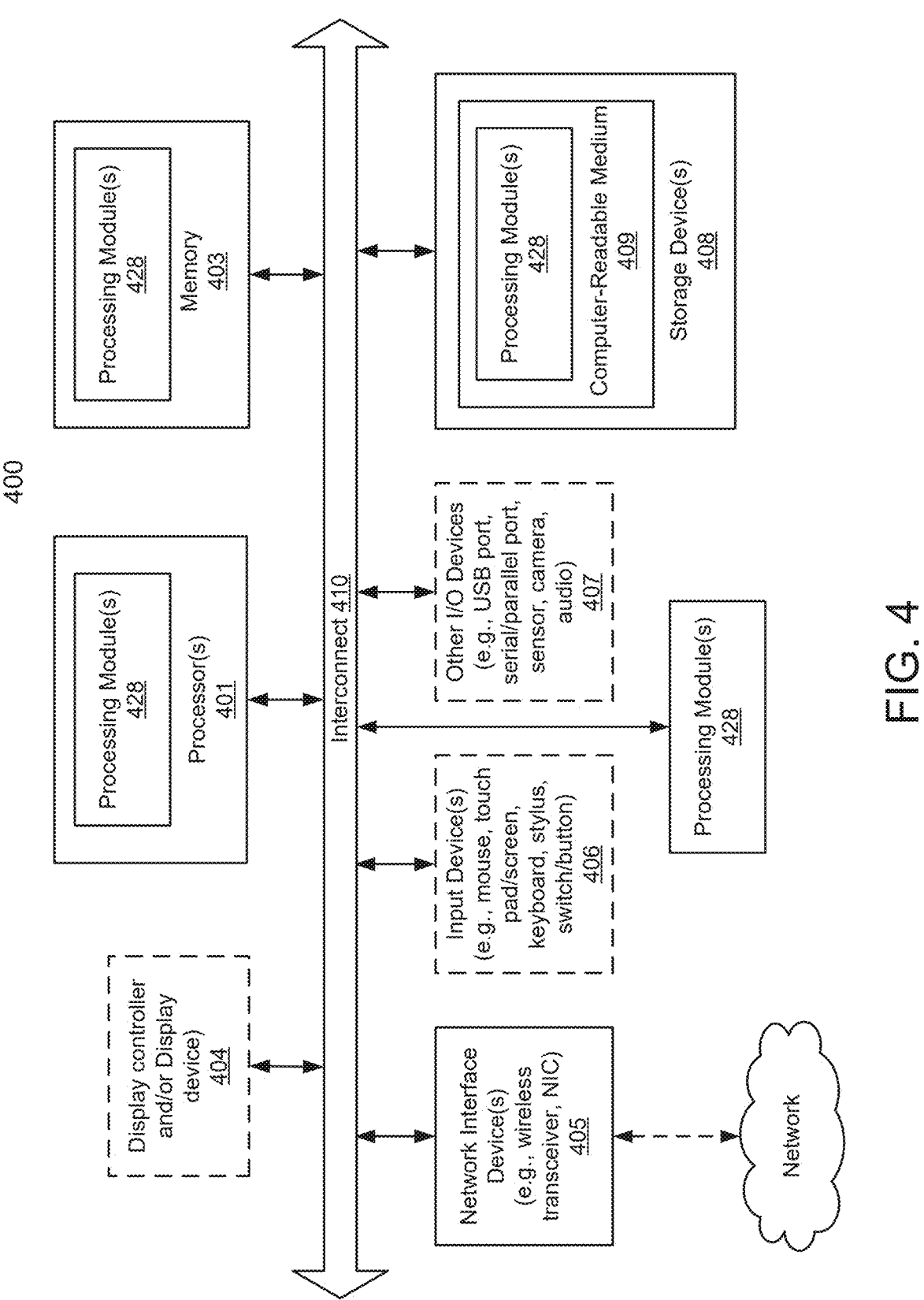
FIG. 4 shows a block diagram illustrating a data processing system in accordance with an embodiment.

Hardware resources 150 may include any number of physical devices (e.g., processors, memory modules, storage devices, communication devices, etc.) that provide computing resources (e.g., processor cycles). The computing resources may be used to support applications (e.g., computing instructions executing with the computing resources) hosted by data processing system 100 that provide the computer-implemented services. When operating, hardware resources 150 may consume and require electrical power to provide the computing resources. To obtain the electrical power, hardware resources may receive power (e.g., via the electrical circuit hosted by data processing system 100) from batteries 140 and/or any number of power delivery devices via a power delivery path. The hardware resources may operate as a computing device. Refer to FIG. 4 for additional details regarding computing devices.

Thus, as shown in FIG. 1B, a switch network may be reconfigured to establish power delivery paths usable to delivery desired power from an external device attached to a port of a data processing system to load components (e.g., battery, hardware resources, etc.) of the data processing system. The power delivery paths may also be usable to delivery power to an external device that consumes power and may be attached to a port of the data processing system.

Figure 1C:
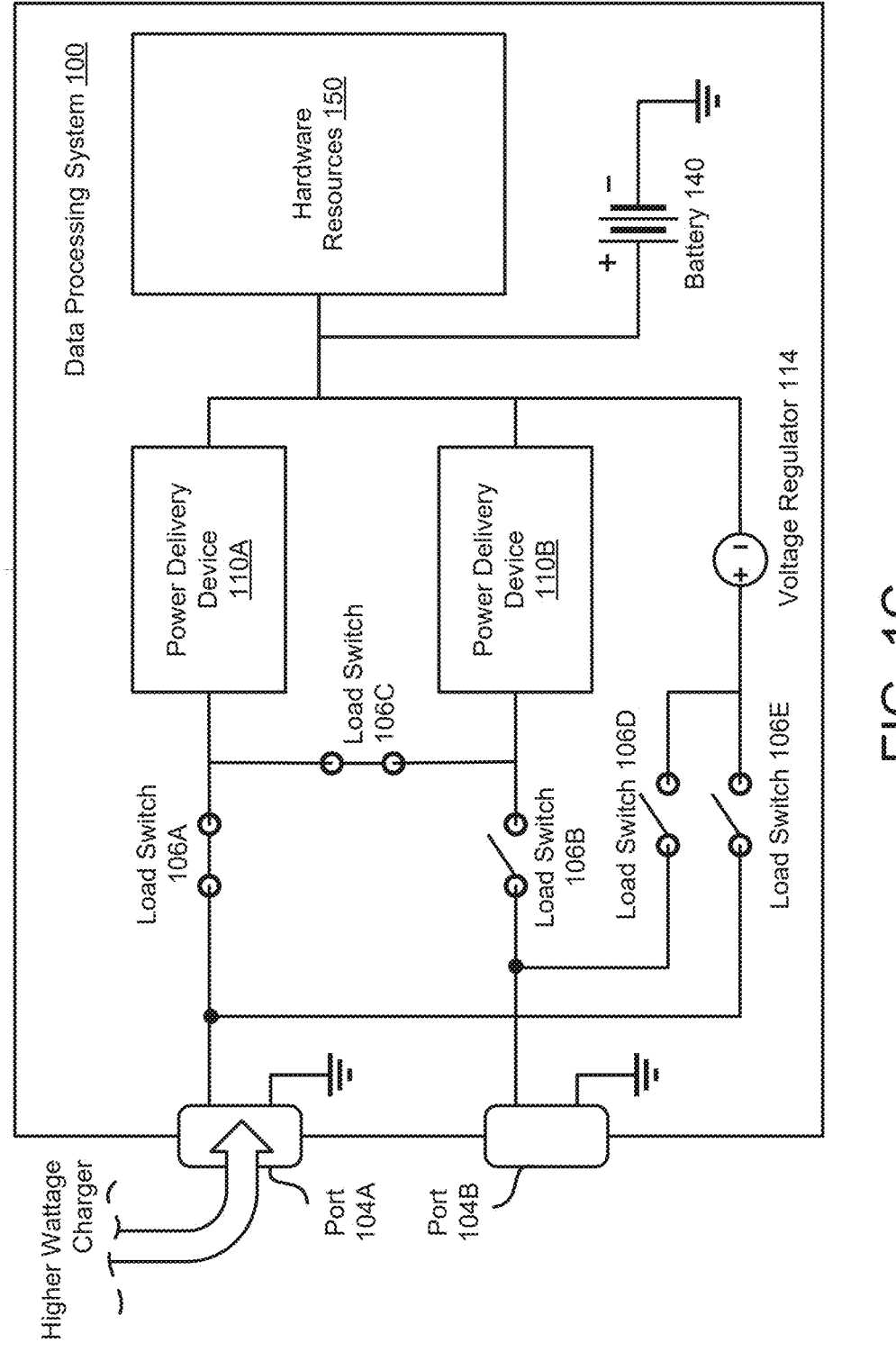
FIGS. 1C-1E show diagrams illustrating example data processing systems in accordance with an embodiment.
Figure 1D:
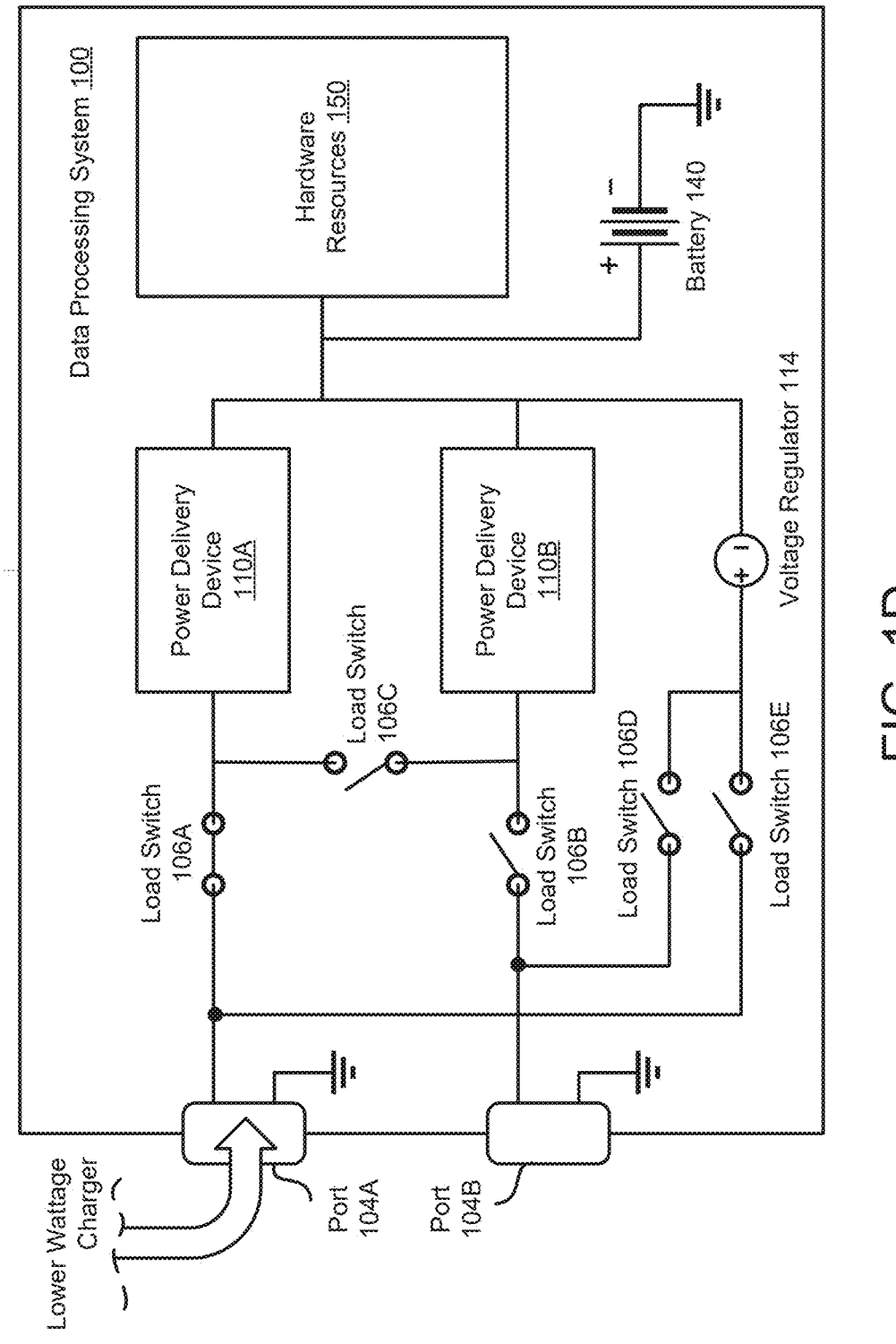
Figure 1E:
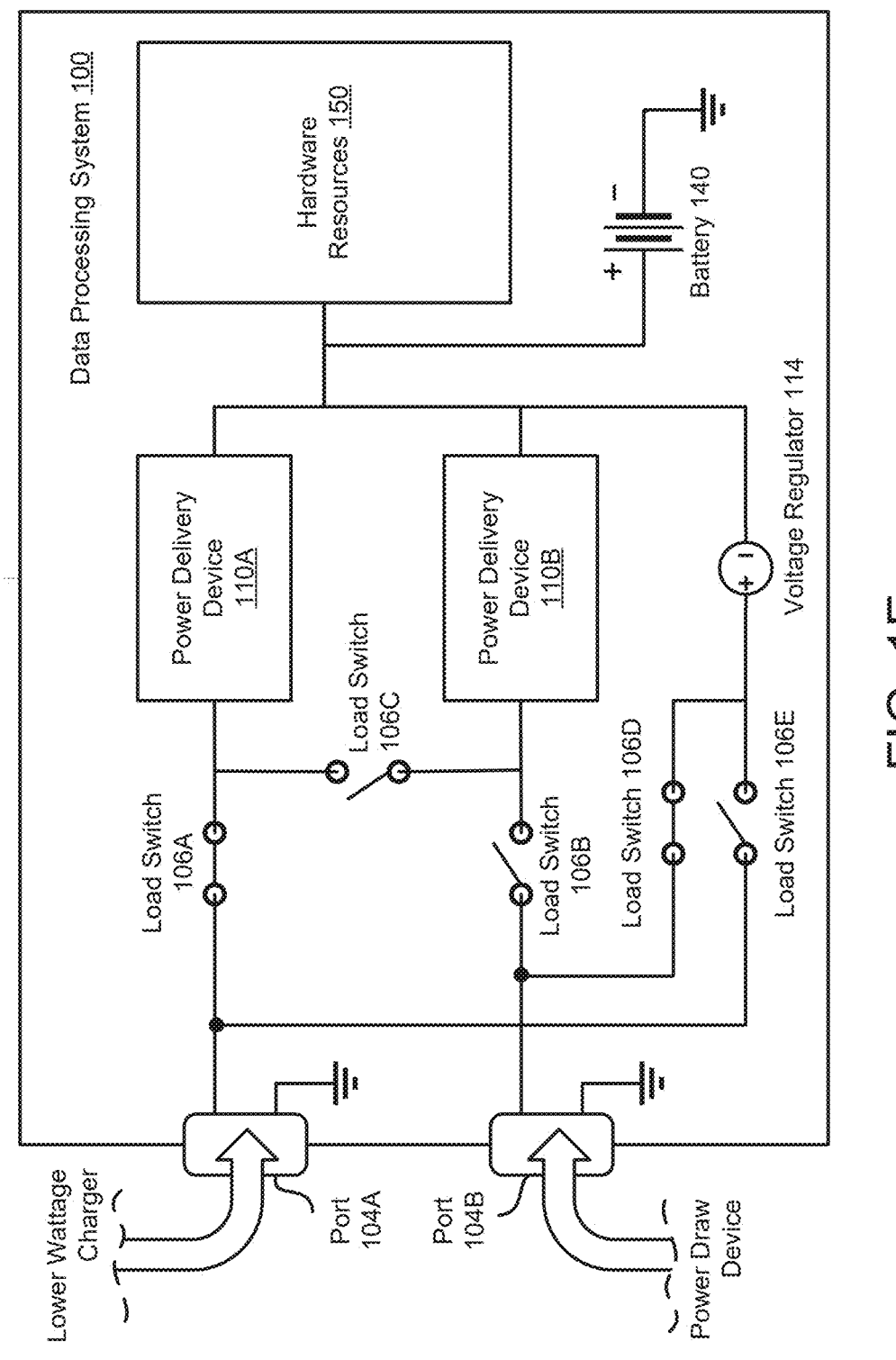

Turning to FIGS. 1C-1E, diagrams illustrating operation of a system similar to that shown in FIGS. 1A-1B in accordance with an embodiment are shown.

In FIG. 1C, consider an example scenario in which an external device may be a high wattage charger (e.g., provisioning power at a power provisioning rate of 130 watts) and may be attached to port 104A. Based on the power provisioning rate of 130 watts and a power delivery limit (e.g., 65 watts) of each of power delivery device 110A and power delivery device 110B, a configuration for the switch network of data processing system 100 may be selected. Connectivity of the switch network may then be updated based on the configuration. To do so, load switch 106A and load switch 106C may be closed, and load switch 106B, load switch 106D, and load switch 106E may be opened.

By updating the connectivity of the switch network as such, a power delivery path established by the switch network may enable power (e.g., at the power provisioning rate of 130 watts) to flow from the high wattage charger attached at port 104A to power delivery device 110A and power delivery device 110B, and subsequently to battery 140 and/or hardware resources 150. Power delivery device 110A and power delivery device 110B may each receive and output a portion (e.g., 65 watts) of the power delivered through the power delivery path, and cooperatively provide a desired power (e.g., 130 watts) to battery 140 and/or hardware resources 150.

Turning to FIG. 1D, a second example system is shown in which an external device may be a lower wattage charger (e.g., provisioning power at a power provisioning rate of 65 watts) and may be attached to port 104A. Based on the power provisioning rate of 65 watts and a power delivery limit (e.g., 65 watts) of each of power delivery device 110A and power delivery device 110B, a new configuration for the switch network of data processing system 100 may be selected. Connectivity of the switch network may then be updated based on the new configuration. To do so, load switch 106A may be closed, and all other load switches (e.g., 106B, 106C, 106D, 106E) may be opened.

By updating the connectivity of the switch network as such, a power delivery path established by the switch network may enable desired power (e.g., at the power provisioning rate of 65 watts) to flow from the lower wattage charger attached at port 104A to power delivery device 110A, and subsequently to battery 140 and/or hardware resources 150.

Turning to FIG. 1E, a third example system is shown in which, similar to FIG. 1D, an external device may be the lower wattage charger (e.g., provisioning power at a power provisioning rate of 65 watts) and may be attached to port 104A. In FIG. 1E, a second external device that may be a power draw device and may be attached to port 104B. Based on the power provisioning rate of 65 watts of the lower wattage charger at port 104A and the attachment of the power draw device at port 104B, a new configuration for the switch network of data processing system 100 may be selected. Connectivity of the switch network may then be updated based on the new configuration. To do so, load switch 106A and load switch 106D may be closed, and all other load switches (e.g., 106B, 106C, 106E) may be opened.

By updating the connectivity of the switch network as such, a power delivery path established by the switch network may enable desired power (e.g., at the power provisioning rate of 65 watts) to flow from the lower wattage charger attached at port 104A to power delivery device 110A, and subsequently to battery 140 and/or hardware resources 150. Additionally, by closing load switch 106D, the power delivery path may enable power to flow from battery 140, via voltage regulator 114, out to the power draw device attached at port 104B.

Thus, as shown in FIGS. 1C-1E, data processing system 100 may manage distribution of power by reconfiguring a switch network based on a power provisioning rate of a power provisioning device and/or an attachment of a power consuming device.

To further clarify embodiments disclosed herein, a data flow diagram in accordance with an embodiment is shown in FIG. 2. In the diagram, flows of data and processing of data are illustrated using different sets of shapes. A first set of shapes (e.g., 200, 202, etc.) is used to represent processes performed using and/or that generate data, and a second set of shapes (e.g., 220) is used to represent large scale data structures such as databases.

Turning to FIG. 2, a data flow diagram in accordance with an embodiment is shown. The data flow diagram may illustrate data used in and data processing performed in managing power distribution in a data processing system.

To identify a connection of an external device to the data processing system, port connection process 200 may be performed. During port connection process 200, an external device may attach to a port of data processing system 100, and data processing system 100 may identify an occurrence of the attachment of the external device. To attach the external device to the port, a connector (e.g., USB Type-C) of a cable that is connected to the external device may be inserted into the port of data processing system 100. Data processing system 100 may identify the occurrence of the attachment by monitoring (e.g., polling) each port of ports 104 and identifying events (e.g., insertion and/or ejection of a device) that may occur at the port. When an attachment of an external device is identified, data processing system 100 may obtain information regarding the external device.

To identify a class of the attached external device, device classification process 202 may be performed. During device classification process 202, data processing system 100 may obtain information (e.g., device descriptors) regarding a class of the attached external device. To obtain the information, data processing system 100 may (i) communicate with the external device (e.g., while the external device is operating in a low voltage state), (ii) retrieve the information from the external device, and/or via any other processes. The information may include, for example, a class, a subclass, properties of the device, and/or any other information. Based on the information obtained from the external device, data processing system 100 may identify whether the external device is a power provisioning device or a power consuming device.

If the information indicates that the external device is a power provisioning device, input charge identification process 204 may be performed. During input charge identification process 204, a power provisioning rate of the external device may be identified. To identify the power provisioning rate of the external device, data processing system 100 may (i) communicate a request to the external device, (ii) obtain the power provisioning rate from the information obtained during device classification process 202, and/or via any other process. By doing so, data processing system 100 may select a new configuration for a switch network of data processing system 100 based on the power provisioning rate.

To establish a power delivery path for the power provisioned by the external device, charging switch reconfiguration process 206 may be performed. During charging switch reconfiguration process 206, a switch network configuration may be selected, and connectivity of the switch network may be updated based on the selected switch network configuration. To select the switch network configuration, information including the power provisioning rate, efficiency curve of power delivery devices in a power delivery circuit of the data processing system, and/or any other information may be used to identify a switch network configuration from switch configuration repository 220.

Switch configuration repository 220 may include, for example, (i) a truth table for logical control of switches in the switch network of data processing system 100, (ii) instructions for updating connectivity of the switches, and/or any other information. For example, based on a port that the external device is attached, a power provisioning rate of a certain wattage, and a power delivery capacity of a power delivery device, a configuration may be selected from switch configuration repository 220 that indicates that a portion of load switches are to be closed and a second portion of the load switches are to be open to establish a certain power delivery path.

Once the switch network configuration is selected, the connectivity of the switch network may be updated. To update connectivity of the switch network, the instructions may be implemented according to the configuration. For example, if the external device is attached at a first port of data processing system 100, a first load switch of the switch network may be closed and all other load switches may be open to establish a power delivery path from the first port to load components of the data processing system that require power.

To provide the power to the load components, charging process 208 may be performed. During charging process 208, power delivery may be initiated, and power may be consumed by the load components. To initiate the power delivery, data processing system 100 and/or a controller of data processing system 100 may (i) provide a command that initiates power flow from the port to which the external device is attached, (ii) allow power to flow based on the established power delivery path, and/or perform any other actions. The power may then be provided to any number and/or type of load components. For example, power may be delivered to a battery of data processing system 100, where it may be stored for future use, and/or the power may be delivered to hardware resources hosted by data processing system 100 for processing and/or use in providing computer-implemented services.

However, during device classification process 202, if the information indicates that the external device may be power consuming device, power output switch reconfiguration process 210 may be performed. During power output switch reconfiguration process 210, data processing system 100 may, similarly to charging switch reconfiguration process 206, select a second switch network configuration, and connectivity of the switch network may be updated based on the second switch network configuration. The second switch network configuration may also be identified from switch configuration repository, and may indicate that a third portion of load switches are to be closed and a fourth portion of the load switches are to be open to establish a certain power delivery path.

To update connectivity of the switch network for power output to the external device, the instructions may be implemented according to the configuration. For example, if the external device is attached at a second port of data processing system 100, a fourth load switch of the switch network may be closed and all other load switches may be open to establish a power delivery path from the battery (e.g., via a voltage regulator) to the second port of the data processing system.

To provide the power to the external device that consumes power, power output process 212 may be performed. During power output process 212 may, power delivery may be initiated, and a voltage of the power may be regulated. To initiate the power delivery, instructions may be provided to the battery that may indicate a request to draw power from the battery. The power may then be allowed to flow based on the established power delivery path. To regulate the voltage of the power delivery, a device (e.g., a voltage regulator) may (i) identify a voltage compatible with the external device, (ii) modify a property of the power based on the voltage, (iii) maintain a constant voltage during power delivery, and/or perform any other actions. By doing so, power may be provided by the data processing system to the external device that consumes power.

Thus, using the data flow shown in FIG. 2, power may be distributed to and/or by a data processing system by reconfiguring a switch network based on information obtained regarding an external device that may be attached to the data processing system. By doing so, desired power may be provided to entities (e.g., load components of the data processing system, the external device, etc.) that may require power.

Any of the processes illustrated using the first set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the first set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-1B may perform various methods to manage power distribution for a data processing system. FIG. 3 illustrates a method that may be performed by the components of the system of FIGS. 1A-1B. In the diagrams discussed below and shown in FIG. 3, any of the operations may be repeated, performed in different orders, and/or performed in parallel with or in a partially overlapping in time manner with other operations.

Turning to FIG. 3, a flow diagram illustrating a method of managing power distribution for a data processing system in accordance with an embodiment is shown. The method may be performed, for example, by any of the components of the system of FIGS. 1A-1B, and/or other components not shown therein.

At operation 300, an occurrence of a change in attachment of an external device to a port of the data processing system may be identified. The occurrence may be identified by: (i) monitoring (e.g., polling) each port of ports 104 and identifying events (e.g., insertion and/or ejection of a device) that may occur at the port, (ii) obtaining a request to establish a connection from the external device attached to the port, and/or any other process.

At operation 302, the external device may be classified as either a power provisioning device or a power consumer device. The external device may be classified by: (i) communicating with the external device while the external device is attached to the port, (ii) retrieving information (e.g., a device identifier, class, etc.) from descriptors of the external device, and/or any other processes. If the external device is classified as a power provisioning device, then the method may proceed to operation 304. If the external device is classified as a power consuming device, then the method may proceed to operation 310.

At operation 304, a power provisioning rate of the external device may be identified. The power provisioning rate may be identified by: (i) communicating, to the external device, a request for information regarding the power provisioning rate, (ii) receiving the requested information, (iii) retrieving the information from the descriptors of the external device, and/or any other process.

At operation 306, a switch network that connects a port of the data processing system to which the external device is connected may be reconfigured. The switch network may be reconfigured by: (i) selecting, based on the power provisioning rate and efficiency curves for power delivery devices of the data processing system, a new configuration (e.g., from a switch repository) for the switch network, (ii) implementing computer instructions to control load switches of the switch network, (iii) updating connectivity of the switch network based on the new configuration, and/or any other process.

At operation 308, power delivery to the data processing system may be performed using the power delivery path. The power delivery may be performed by: (i) initiating power draw from the external device, (ii) allowing power to flow along the established power delivery path, (iii) processing the power to be usable with load components of the data processing system, (iv) storing the power in a battery of the data processing system, and/or any other process.

The method may end following operation 308.

Returning to operation 302, the method may proceed to operation 310 when the external device is classified as a power consuming device.

At operation 310, a second reconfiguration of the switch network may be performed to establish a second power delivery path for delivery of power to the external device by the data processing system. The second reconfiguration may be performed by: (i) selecting, based on the port to which the external device is attached, a new configuration (e.g., from a switch repository) for the switch network, (ii) implementing computer instructions to control load switches of the switch network, (iii) updating connectivity of the switch network based on the new configuration, and/or any other process.

At operation 312, power delivery to the external device may be performed using the second power delivery path. The power delivery may be performed by: (i) providing instructions to the battery to share power to the external device, (ii) initiating power draw from the battery to the port to which the external device is attached via the second power delivery path, (iii) regulating the power using a voltage regulating so that a constant voltage compatible with the external device is delivered, (iv) outputting the power from the port to the external device, and/or any other process.

The method may end following operation 312.

Using the method shown in FIG. 3, power distribution may be managed by a data processing system by reconfiguring a switch network based on a classification of an external device that may provision or consume power that may be attached to the data processing system. By doing so, a likelihood of desired power being provided to the data processing system and/or the external device may be improved.

Any of the components illustrated in FIGS. 1A-1E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing power distribution for a data processing system, the method comprising:
identifying an occurrence of a change in attachment of an external device to a port of the data processing system;
based on the occurrence:
classifying the external device with respect to power consumption and power provisioning;
in a first instance of the classifying where the external device is classified as a power provisioning device:
identifying a power provisioning rate of the external device;
reconfiguring, based on the power provisioning rate, a switch network that connects the port of the data processing system to which the external device is connected to establish a power delivery path for delivery of power by the external device to the data processing system; and
performing power delivery to the data processing system using the power delivery path.

2. The method of claim 1, wherein identifying the power provisioning rate of the external device comprises:
communicating, by the data processing system and to the external device, a request for information regarding the power provisioning rate of the external device; and
obtaining, by the data processing system, the information.

3. The method of claim 1, wherein reconfiguring the switch network comprises:
selecting, based on the power provisioning rate and efficiency curves for power delivery devices of the data processing system, a new configuration for the switch network; and
updating connectivity of the switch network based on the new configuration.

4. The method of claim 3, wherein the switch network comprises:
a first load switch that connects the port to a first power delivery device of the power delivery devices;
a second load switch that connects a second port of the data processing system to a second power delivery device of the power delivery devices;
a third load switch that connects the port to the second power delivery device;
a fourth load switch that connects a voltage source to the second port, the voltage source supplying power from a battery of the data processing system; and
a fifth load switch that connects the voltage source to the port.

5. The method of claim 4, wherein each load switch of the first load switch, the second load switch, the third load switch, the fourth load switch, and the fifth load switch is a computer controllable device that allows power to flow between two entities that the load switch connects when the load switch is closed and does not allow power to flow between the two entities when the load switch is open.

6. The method of claim 5, wherein updating the connectivity comprises:
closing the first load switch and the third load switch so that the port is connected to both the first power delivery device and the second power delivery device; and
opening the second load switch, the fourth load switch, and the fifth load switch so that the second port is not connected to any power delivery device and the voltage source is not connected to any port.

7. The method of claim 5, wherein updating the connectivity comprises:
closing the first load switch so that the port is connected to the first power delivery device; and
opening the second load switch, the third load switch, the fourth load switch, and the fifth load switch so that the second port is not connected to any power delivery device and the voltage source is not connected to any port.

8. The method of claim 4, further comprising:
in a second instance of the classifying where the external device is classified as a power consuming device:
performing a second reconfiguration of the switch network that connects the port of the data processing system to which the external device is connected to establish a second power delivery path for delivery of power to the external device by the data processing system; and performing power delivery to the external device using the second power delivery path.

9. The method of claim 8, wherein performing the second reconfiguration of the switch network comprises:

closing the first load switch so that the port is connected to the first power delivery device; and opening the second load switch, the third load switch, the fourth load switch, and the fifth load switch so that the second port is not connected to any power delivery device and the voltage source is not connected to any port.

10. A non-transitory machine-readable medium having instructions stored therein, which when executed by a processor, cause the processor to perform operations for managing power distribution for a data processing system, the operations comprising:

identifying an occurrence of a change in attachment of an external device to a port of the data processing system;

based on the occurrence:

classifying the external device with respect to power consumption and power provisioning;

in a first instance of the classifying where the external device is classified as a power provisioning device:

identifying a power provisioning rate of the external device;

reconfiguring, based on the power provisioning rate, a switch network that connects the port of the data processing system to which the external device is connected to establish a power delivery path for delivery of power by the external device to the data processing system; and performing power delivery to the data processing system using the power delivery path.

11. The non-transitory machine-readable medium of claim 10, wherein identifying the power provisioning rate of the external device comprises:

communicating, by the data processing system and to the external device, a request for information regarding the power provisioning rate of the external device; and obtaining, by the data processing system, the information.

12. The non-transitory machine-readable medium of claim 10, wherein reconfiguring the switch network comprises:

selecting, based on the power provisioning rate and efficiency curves for power delivery devices of the data processing system, a new configuration for the switch network; and updating connectivity of the switch network based on the new configuration.

13. The non-transitory machine-readable medium of claim 12, wherein the switch network comprises:

a first load switch that connects the port to a first power delivery device of the power delivery devices;

a second load switch that connects a second port of the data processing system to a second power delivery device of the power delivery devices;

a third load switch that connects the port to the second power delivery device;

a fourth load switch that connects a voltage source to the second port, the voltage source supplying power from a battery of the data processing system; and a fifth load switch that connects the voltage source to the port.

14. The non-transitory machine-readable medium of claim 13, wherein each load switch of the first load switch, the second load switch, the third load switch, the fourth load switch, and the fifth load switch is a computer controllable device that allows power to flow between two entities that the load switch connects when the load switch is closed and does not allow power to flow between the two entities when the load switch is open.

15. The non-transitory machine-readable medium of claim 14 wherein updating the connectivity comprises:

closing the first load switch and the third load switch so that the port is connected to both the first power delivery device and the second power delivery device; and opening the second load switch, the fourth load switch, and the fifth load switch so that the second port is not connected to any power delivery device and the voltage source is not connected to any port.

16. A data processing system, comprising:

a processor;

and a memory coupled to the processor to store instructions, which when executed by the processor, cause the processor to perform operations for managing power distribution with the data processing system, the operations comprising:

identifying an occurrence of a change in attachment of an external device to a port of the data processing system;

based on the occurrence:

classifying the external device with respect to power consumption and power provisioning;

in a first instance of the classifying where the external device is classified as a power provisioning device:

identifying a power provisioning rate of the external device;

reconfiguring, based on the power provisioning rate, a switch network that connects the port of the data processing system to which the external device is connected to establish a power delivery path for delivery of power by the external device to the data processing system; and performing power delivery to the data processing system using the power delivery path.

17. The data processing system of claim 16, wherein identifying the power provisioning rate of the external device comprises:

communicating, by the data processing system and to the external device, a request for information regarding the power provisioning rate of the external device; and obtaining, by the data processing system, the information.

18. The data processing system of claim 16, wherein reconfiguring the switch network comprises:

selecting, based on the power provisioning rate and efficiency curves for power delivery devices of the data processing system, a new configuration for the switch network; and updating connectivity of the switch network based on the new configuration.

19. The data processing system of claim 18, wherein the switch network comprises:

a first load switch that connects the port to a first power delivery device of the power delivery devices;

a second load switch that connects a second port of the data processing system to a second power delivery device of the power delivery devices;

a third load switch that connects the port to the second power delivery device;

a fourth load switch that connects a voltage source to the second port, the voltage source supplying power from a battery of the data processing system; and a fifth load switch that connects the voltage source to the port.

20. The data processing system of claim 19, wherein each load switch of the first load switch, the second load switch, the third load switch, the fourth load switch, and the fifth load switch is a computer controllable device that allows power to flow between two entities that the load switch connects when the load switch is closed and does not allow power to flow between the two entities when the load switch is open.

* * * * *